US008675093B2

(12) United States Patent
Nagata

(10) Patent No.: US 8,675,093 B2
(45) Date of Patent: Mar. 18, 2014

(54) IMAGE CAPTURING APPARATUS AND IMAGE PROCESSING METHOD

(75) Inventor: Toru Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/945,209

(22) Filed: Nov. 12, 2010

(65) Prior Publication Data

US 2011/0122283 A1   May 26, 2011

(30) Foreign Application Priority Data

Nov. 20, 2009   (JP) ................. 2009-265533

(51) Int. Cl.
*H04N 9/73* (2006.01)
*H04N 9/083* (2006.01)
*H04N 3/14* (2006.01)
*H04N 5/335* (2011.01)
*H04N 9/04* (2006.01)

(52) U.S. Cl.
USPC ....................... 348/225.1; 348/275

(58) Field of Classification Search
CPC .................................. H04N 5/3696
USPC ........... 348/225.1, 268–271, 275, 278, 279
See application file for complete search history.

(56) References Cited

U.S. PATENT DOCUMENTS

| 5,298,935 | A | 3/1994 | Nagata | 354/430 |
| 6,363,220 | B1 * | 3/2002 | Ide | 348/345 |
| 6,822,677 | B1 * | 11/2004 | Takahashi | 348/223.1 |
| 7,463,287 | B2 * | 12/2008 | Aotsuka | 348/223.1 |
| 2007/0146497 | A1 * | 6/2007 | Yamamoto | 348/222.1 |
| 2009/0032678 | A1 * | 2/2009 | Taniguchi | 250/201.2 |
| 2009/0213255 | A1 * | 8/2009 | Suzuki | 348/302 |
| 2009/0256927 | A1 * | 10/2009 | Komiya et al. | 348/222.1 |
| 2010/0321525 | A1 | 12/2010 | Nagata | 348/230.1 |
| 2011/0013061 | A1 * | 1/2011 | Hoda et al. | 348/294 |

FOREIGN PATENT DOCUMENTS

| JP | 62-012976 A | 1/1987 |
| JP | 04-088765 A | 3/1992 |
| JP | 05-197009 A | 8/1993 |
| JP | 06-292207 A | 10/1994 |
| JP | 2004-064413 A | 2/2004 |
| JP | 2006-005500 A | 1/2006 |
| JP | 2007-158628 A | 6/2007 |
| JP | 2007-278950 A | 10/2007 |
| JP | 2008-219328 A | 9/2008 |
| WO | WO 2009133960 A1 * | 11/2009 |

* cited by examiner

*Primary Examiner* — Sinh Tran
*Assistant Examiner* — Jason Flohre
(74) *Attorney, Agent, or Firm* — Fitzpatrick, Cella, Harper & Scinto

(57) ABSTRACT

An image capturing apparatus performs RGB three-band image capturing. Additional band pixels BG and OG having a spectral sensitivity peak wavelength between the B and G bands and between the R and G bands, respectively, are disposed on an image sensor consisting of RGB pixels. A feature quantity in the spectral characteristics of light incident on the sensor is obtained based on pixel values in the additional bands and pixel values in the RGB bands detected by the image sensor, and is applied to image processing of a captured object image. In order to maintain the image capturing resolution, in the image sensor, the number of additional band pixels is smaller than the number of R pixels, the number of G pixels, and the number of B pixels.

7 Claims, 8 Drawing Sheets

701 702

703 704

IMAGE CAPTURING APPARATUS AND IMAGE PROCESSING METHOD

BACKGROUND OF THE INVENTION

1. Field of the Invention

The present invention relates to an image capturing apparatus that obtains images by an image sensor with RGB pixels receiving incident light from an object, and an image processing method.

2. Description of the Related Art

Generally, object light has spectral characteristics of a light source or spectral characteristics as a combination of the light source and the object reflectance. Whether for film cameras that use photosensitive film or for digital cameras that obtain digital image data, technologies for determining light-source information based on the spectral characteristics of the light source in order to accurately reproduce the color of the object have been extensively developed.

For example, a technology is disclosed in which a camera is provided with a colorimetric sensor for measuring the environment where the camera is present and the light-source information determined by that sensor is recorded on a recording medium (for example, see Japanese Patent Laid-Open No. 05-197009). Furthermore, a technology is disclosed in which an object is recorded as an image of spectral distribution or spectral reflectance by using a multi-band camera that captures an image through a plurality of types of filters having different transmission wavelength ranges (for example, see Japanese Patent Laid-Open No. 2007-278950).

On the other hand, with respect to image capturing apparatuses such as digital cameras, chromatic aberration of their objective lenses is a factor that causes a deterioration of the image quality. In order to correct this chromatic aberration by image processing, the following technologies are known. For example, a technology is disclosed that performs chromatic-aberration correction with use of the dependence of chromatic aberration on the image height from the center of an imaging device, which is an imaging plane of that lens, and the wavelength of incident light (for example, see Japanese Patent Laid-Open No. 06-292207). Moreover, a technology that uses a spacial filter having inverse characteristics of a point spread function (PSF), or OTF characteristics from which inverse characteristics PSF are generated, to perform chromatic-aberration correction is disclosed (for example, see Japanese Patent Laid-Open Nos. 62-12976 and 04-88765).

More exactly, chromatic-aberration correction as described above needs to be performed according to the spectral characteristics of light rays incident on an image sensor. Thus, a technology for controlling chromatic-aberration correction based on color temperature or white balance information in a camera is disclosed (for example, see Japanese Patent Laid-Open No. 2007-158628).

Generally, light incident on an image sensor depends on the spectral characteristics of a light source, the spectral reflectance of an object, and furthermore, the emission spectral characteristics of an object that emits light. At this time, there is a problem that if a feature quantity of light rays incident on the image sensor is determined based on the respective pixel values of the R, G, and B bands, the color temperature, the colorimetric value, or the white balance information, accuracy cannot be ensured. For example, when it is desired to distinguish between an artificial green object and a plant and separately perform optimum color processing for each of them, attention needs to be paid to the difference in spectral characteristics between them. However, in such a case, even when RGB pixel values of the artificial green object and the plant are obtained, discrimination is impossible if their colorimetric values are close to each other, and thus, the intended processing cannot be performed.

On the other hand, it is possible to estimate the spectral characteristics of light incident on the image sensor by using a multi-band camera. For example, a method in which, in a camera having a monochrome image sensor, a plurality of images are captured while switching filters of respective bands or a method that uses a camera in which all the bands are disposed on a single-plate image sensor are conceivable. However, the former method has the problems that capturing an image is extremely complicated and furthermore an image of a moving object cannot be captured. The latter method has the problem that the resolution is lower than that of RGB three-band cameras with the same number of pixels.

Moreover, in the case of realizing correction of the chromatic aberration as described above by image processing, it is necessary to discriminate between incident light rays having high power peaks at wavelengths between adjacent bands (RG and BG) and incident light rays having average power in each of the R, G, and B bands. If it is not possible to determine the difference in spectral characteristics between these incidents light rays, chromatic aberration not only cannot be properly corrected for, but also may rather become worse.

SUMMARY OF THE INVENTION

The present invention makes it possible for an image capturing apparatus that performs RGB three-band image capturing to easily capture an image without decreasing the resolution, and simultaneously makes it possible to detect a peculiarity in the spectral characteristics of incident light and perform appropriate image processing according to the feature quantity.

According to one aspect of the present invention, an image capturing apparatus comprises an imaging unit that has an image sensor in which reference band pixels and additional band pixels are arranged and that is configured to capture an object image by the image sensor receiving incident light from an object. The reference band pixels consist of R band pixels, G band pixels, and B band pixels having spectral sensitivity peak wavelengths in R, G, and B bands, respectively. The additional band pixels each have a spectral sensitivity peak wavelength between the spectral sensitivity peak wavelengths of a pair of adjacent bands among the R, G, and B bands. The apparatus also comprises an obtaining unit configured to obtain reference band pixel values detected by the reference band pixels of the image sensor and additional band pixel values detected by the additional band pixels in the object image captured by the imaging unit. The apparatus further comprises a spectral analysis unit configured to obtain a feature quantity in spectral characteristics of the incident light by analyzing the reference band pixel values and the additional band pixel values, and an image processing unit configured to perform image processing on the object image according to the feature quantity. In the image sensor, the number of additional band pixels is smaller than any of the number of R band pixels, the number of G band pixels, and the number of B band pixels.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The embodiments below are not to be construed as limiting the present invention as set forth in the claims, and not all the combinations of features described in the embodiments are necessary for means of solving the problems of the present invention.

First Embodiment

Before describing the present embodiment, a pixel arrangement of an image sensor, which is a feature of the present embodiment, will be first described.

Pixel Arrangement of Image Sensor

In an image capturing apparatus of the present embodiment, additional band pixels are disposed on an image sensor having R band pixels, G band pixels, and B band pixels as reference band pixels, the additional band pixels having spectral sensitivity peaks between spectral sensitivity peak wavelengths of pairs of adjacent bands (RG, BG). The image capturing apparatus is characterized by that a peculiarity in the spectral characteristics of light incident on the image sensor is obtained based on additional band pixel values detected by the additional band pixels and reference band pixel values detected by the RGB reference band pixels.

Figure 1:
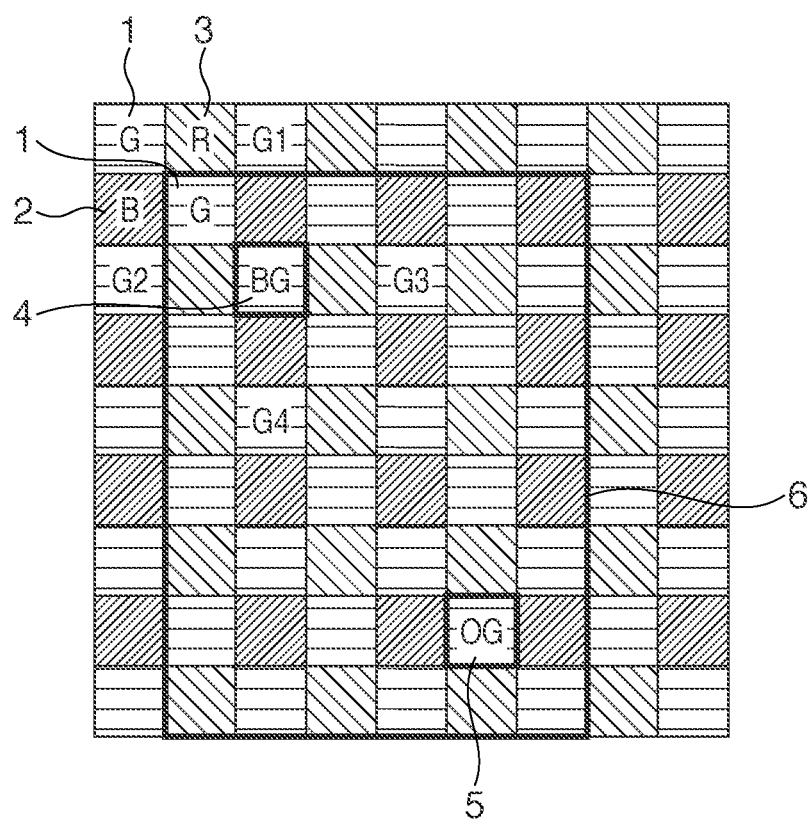
FIG. 1 illustrates a pixel arrangement of an image sensor having RGB pixels and additional pixels according to the first embodiment.

FIG. 1 shows part of the pixel arrangement of the image sensor according to the present embodiment. In this basic array, RGB pixels having mutually different sensitivity characteristics are arranged in the Bayer pattern. In FIG. 1, reference numeral 1 denotes a G band pixel (G pixel) having a spectral sensitivity peak in a green wavelength, and similarly, reference numerals 2 and 3 indicate positions in which a B band pixel (B pixel) and an R band pixel (R pixel), respectively, are arranged. Since these pixels are provided in the Bayer pattern, one B pixel and one R pixel are arranged with two G pixels like the four pixels at the upper left corner. Reference numeral 4 denotes a first additional band pixel having a spectral sensitivity peak between B and G bands, that is, between spectral sensitivity peak wavelengths of the B band and the G band (corresponding to blue green), and hereinafter this pixel will be referred to as a BG pixel. Reference numeral 5 denotes a second additional band pixel having a spectral sensitivity peak between R and G bands, that is, between spectral sensitivity peak wavelengths of the R band and the G band (corresponding to orange), and hereinafter this pixel will be referred to as an OG pixel. The BG pixels and OG pixels are sparsely disposed at the G pixel positions in the Bayer arrangement in a smaller number than the number of R pixels, the number of G pixels, and the number of B pixels.

In the present embodiment, although details will be described later, it is necessary to remove signals of these additional band pixels from image signals, thereafter calculate corresponding signals by interpolation from neighboring G pixels and replace the additional band pixels with the calculated signals. For example, in the case of the array shown in FIG. 1, the BG pixel 4 is replaced with an average of data of the four neighboring pixels denoted by G1 to G4. Alternatively, an average of G1 and G4 or an average of G2 and G3 may be selected as the value to replace the BG pixel 4 in accordance with the direction of change of the G pixels. In this manner, signals of the additional band pixels are ultimately removed from image signals, and the image capturing resolution is thus affected. For this reason, desirably, the disposition frequency of the additional band pixels in the image sensor is on the order of 0.1% or less of the total number of pixels.

Figure 2:
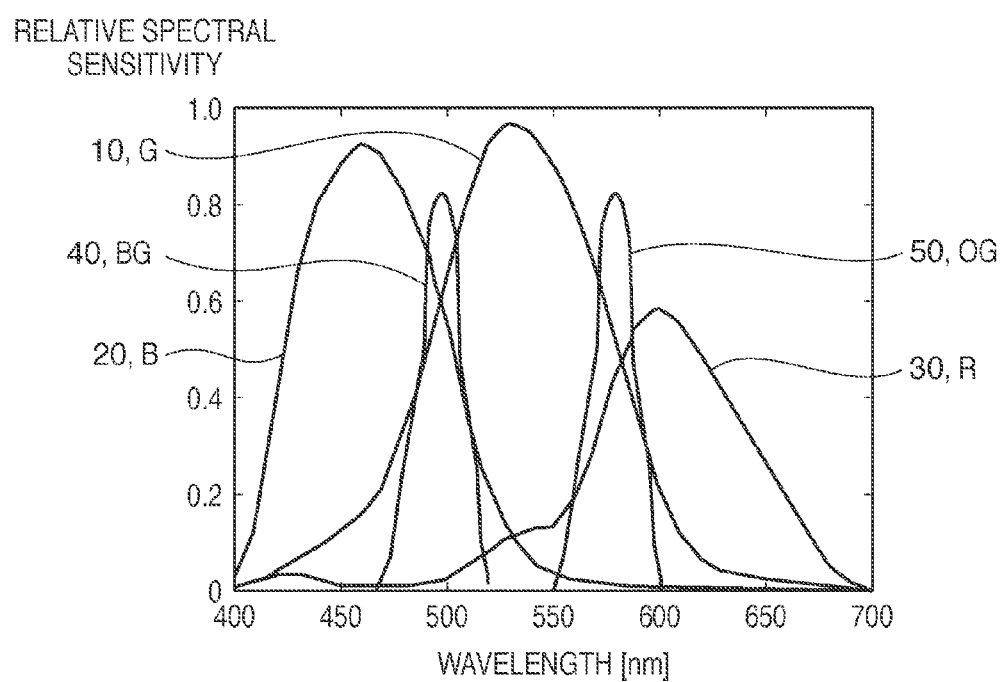
FIG. 2 is a diagram showing spectral sensitivity characteristics of pixels in the image sensor according to the first embodiment.

Here, FIG. 2 shows relative spectral sensitivity characteristics of each band in the image sensor shown in FIG. 1. In FIG. 2, reference numeral 10 denotes the spectral sensitivity characteristics of the G pixels, reference numeral 20 denotes the spectral sensitivity characteristics of the B pixels, and reference numeral 30 denotes the spectral sensitivity characteristics of the R pixels. Moreover, reference numerals 40 and 50 respectively denote the spectral sensitivity characteristics of the BG pixels and the OG pixels. It is apparent from FIG. 2 that the spectral sensitivity peak wavelength of the BG pixels is provided between the spectral sensitivity peaks of the G pixels and the B pixels, and the spectral sensitivity peak of the OG pixels is provided between the spectral sensitivity peaks of the G pixels and the R pixels.

Configuration of the Apparatus

Figure 3:
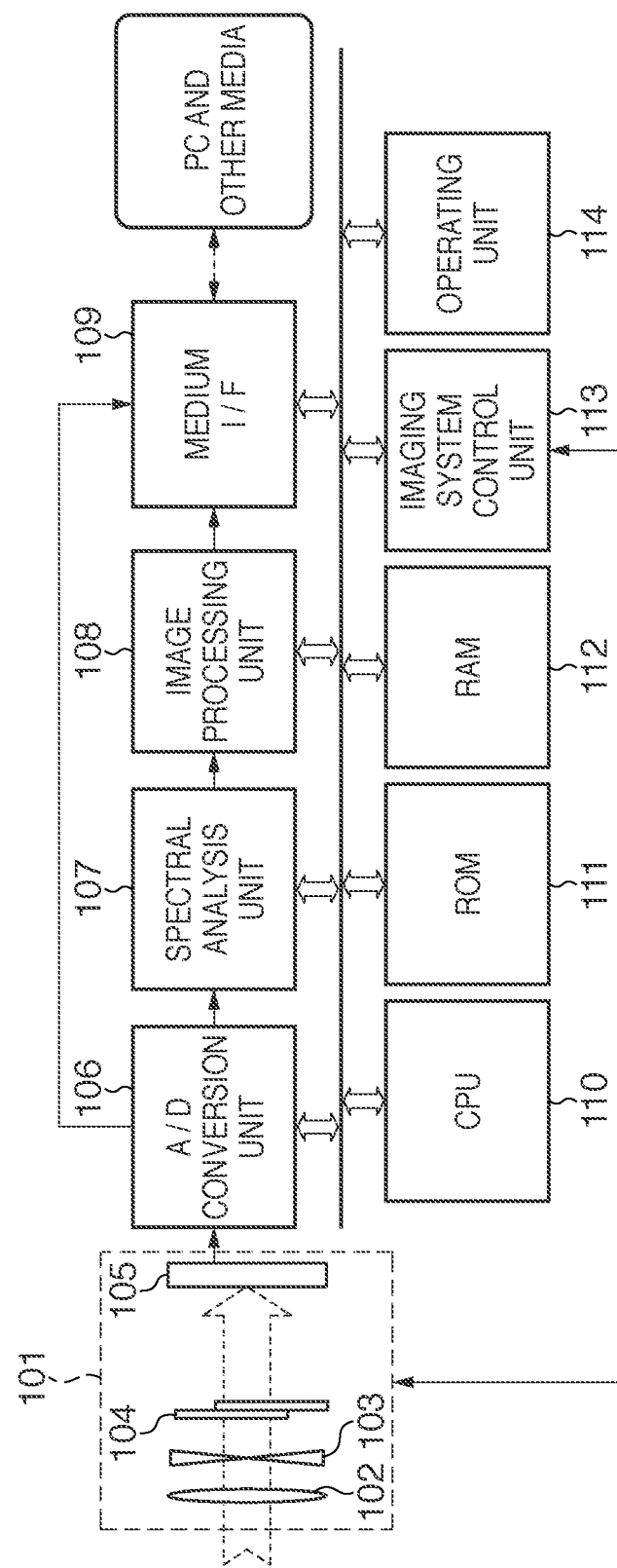
FIG. 3 is a block diagram showing the configuration of an image capturing apparatus according to the first embodiment.

FIG. 3 shows the configuration of the image capturing apparatus according to the present embodiment. In FIG. 3, reference numeral 101 denotes an imaging unit that senses the amount of light from an object, the imaging unit being configured of an objective lens 102, an aperture 103, a shutter 104, and an image sensor 105 such as a CMOS or a CCD. The image sensor 105 is configured as described above using FIGS. 1 and 2, and the imaging unit 101 captures an object image by the image sensor 105 receiving incident light from the object through the objective lens 102, the aperture 103, and the shutter 104.

Reference numeral 106 denotes an A/D conversion unit, which converts an analog signal that is generated according to the amount of light incident on each pixel of the image sensor 105 to digital values. Reference numeral 107 denotes a spectral analysis unit, the details of which will be described later. Reference numeral 108 is an image processing unit, which applies image processing, such as demosaicing, white-balance processing, and gamma processing, to the above-described digital values to generate a digital image. The image processing herein can be performed based on the results of analysis by the spectral analysis unit 107. Reference numeral 109 denotes a medium interface, which can be connected to a PC and other media (for example, a hard disk, a memory card, a CF card, an SD card, and a USB memory) to transmit the digital image to the medium.

Reference numeral 110 denotes a CPU, which is involved in every process in each component of the image capturing apparatus of the present embodiment, and which successively reads and interprets instructions stored in a ROM 111 or a RAM 112 and executes each process according to the interpretation results. The ROM 111 and the RAM 112 provide a program, a data item, a work area, and the like that are necessary for each process to the CPU 110. Reference numeral 113 denotes an imaging system control unit, which performs control of the imaging system including focus control, shutter control, and aperture control as instructed by the CPU 110. Reference numeral 114 denotes an operating unit, such as buttons or a mode dial, through which a user instruction is input and received.

An image capturing process of a digital image in the image capturing apparatus of the present embodiment is no different from image capturing in an ordinary digital camera, and detailed descriptions thereof are therefore omitted herein.

Spectral Characteristics Estimation Process

The image capturing apparatus of the present embodiment is characterized by that a three-band digital image is acquired by the RGB pixels of the image sensor 105, and the spectral characteristics of light incident on the image sensor 105 are at the same time estimated by using the RGB pixels and the additional band pixels BG and OG.

Figure 4:
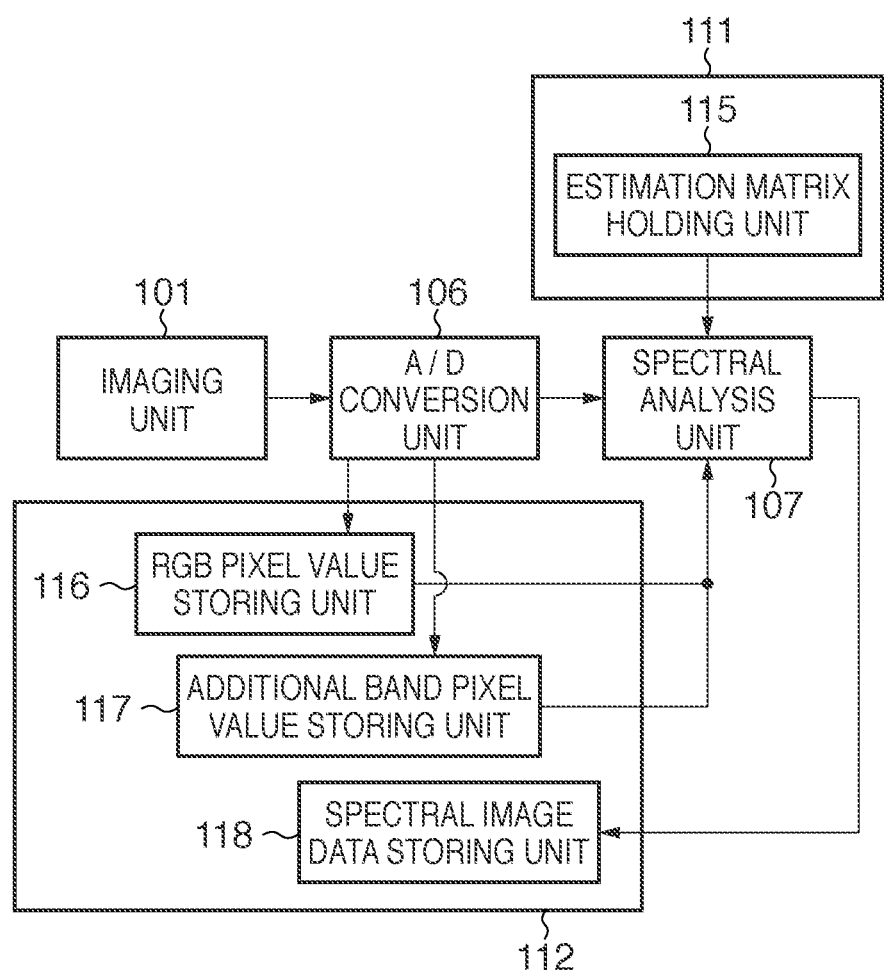
FIG. 4 is a diagram showing a detailed configuration of a spectral analysis unit according to the first embodiment.

FIG. 4 is a diagram showing the relationship between portions that have been extracted from the configuration shown in FIG. 3 and that are particularly related to the estimation of spectral characteristics. In FIG. 4, the imaging unit 101, the A/D conversion unit 106, the spectral analysis unit 107, the ROM 111, and the RAM 112 are denoted by the same reference numerals as in FIG. 3. In the ROM 111, reference numeral 115 denotes an estimation matrix holding unit, which holds an estimation matrix that has been created in advance in order to convert image data of the five bands R, G, B, BG, and OG to spectral characteristics. In the RAM 112, reference numeral 116 denotes an RGB pixel value storing unit that stores RGB pixel values detected by the RGB pixels of the image sensor 105. Reference numeral 117 denotes an additional band pixel value storing unit that stores additional band pixel values detected by the additional band pixels BG and OG of the image sensor 105. Reference numeral 118 denotes a spectral image data storing unit that stores spectral characteristics data that has been estimated according to the present embodiment.

In the present embodiment, the additional band pixels are very sparsely present in the image sensor 105, and therefore, spectral characteristics estimation is performed by the following process. First, attention is paid to a region including at least one BG pixel and one OG pixel as a process unit with respect to which spectral estimation is performed. For example, in FIG. 1, a region 6 including one each of these additional band pixels corresponds to the process unit region. Average values of the R, G, B, BG, and OG bands, respectively, read within this process unit region are stored in the above-described RGB pixel value storing unit 116 and additional band pixel value storing unit 117 as RGB pixel values and additional band pixel values in that region.

Then, in the spectral analysis unit 107, based on the RGB pixel values and additional band pixel values that have been stored as described above, spectral characteristics with respect to a pixel at the central position in the process unit region are estimated using the estimation matrix held in the estimation matrix holding unit 115. In this manner, estimated spectral characteristics are disposed in accordance with the central position in each process unit region, and as a result, a spectral characteristics image corresponding to the captured RGB digital image can be obtained. This spectral characteristics image is stored in the spectral image data storing unit 118.

A known approach can be applied as the spectral characteristics estimation method in the spectral analysis unit 107, and for example, a Wiener estimation method can be used. With this method, the estimation matrix converts five dimensions, which is the number of input bands, to the number of dimensions of spectral data (for example, thirty-six dimensions for recording spectral information from 380 nm to 730 nm at intervals of 10 nm). Thus, a spectral characteristics image composed of thirty-six-dimensional data is obtained.

As described above, according to the present embodiment, additional band pixels having sensitivity peaks at wavelengths between the R and G bands and between the B and G bands are disposed on the image sensor, and the spectral characteristics of light incident on the image sensor can be estimated based on pixel values of these additional band pixels and RGB pixel values. Accordingly, an image that cannot be distinguished only based on RGB digital data, such as a skin colored paint that appears to be the same color as the human skin, can be appropriately distinguished based on the spectral characteristics, making it possible to apply appropriate image processing to such an image in the image processing unit 108 at a downstream stage. Furthermore, since light-source information of the object can also be obtained based on the spectral characteristics, it is also possible to perform advanced white-balance processing on a captured image.

Second Embodiment

Hereinafter, a second embodiment according to the present invention will be described. Components of an image capturing apparatus of the second embodiment including an image sensor are the same as those in FIGS. 1 to 3 of the first embodiment described above, and descriptions thereof are therefore omitted; however, processing in the spectral analysis unit 107 is different from that of the first embodiment. The second embodiment is characterized by that the spectral analysis unit 107 analyzes spectral characteristics, and image degradation due to chromatic aberration in the objective lens 102 is removed in accordance with the results of the analysis.

Basic Chromatic-Aberration-Correction Method

Here, the first chromatic-aberration-correction process, which is a basic chromatic-aberration-correction method in the second embodiment, will be described using FIG. 6.

Generally, assuming that no color shift occurs, that is, the amount of color shift is 0 at a fundamental wavelength of 530 nm in the G band, color shift occurs at a wavelength of 460 nm in the B band and a wavelength of 620 nm in the R band. For example, FIG. 6 shows a color shift distance S of a wavelength in the B band relative to the G band at a point P (x, y), where the center of the image lies at (0, 0). That is to say, with respect to an image that is transmitted through the objective lens 102, an image of the B band is magnified (or reduced) by an amount of shift corresponding to S and then superposed on an image of the G band, whereby a shift between the images of the two bands due to chromatic aberration is corrected for. The same shift correction is also performed between the R band and the G band.

However, it is known that an optimum shifting amount varies with the color temperature of the light source. For example, a light source of a high color temperature results in spectral characteristics that are shifted toward shorter wavelengths as compared with those of a light source of a standard color temperature, so that the amount of color shift increases on the blue side and decreases on the red side. Conversely, a light source of a low color temperature results in spectral characteristics that are shifted toward longer wavelengths, so that the amount of color shift decreases on the blue side and increases on the red side. In this manner, the amount of color shift varies with the color temperature of the light source.

In the second embodiment, in order to address such variation in the amount of color shift depending on the color temperature, the color shift distance S is multiplied by a color temperature correction coefficient k according to the color temperature of the light source, thereby obtaining a chromatic-aberration-correction amount kS taking into account the color temperature of the light source. Here, the color temperature correction coefficient k is a coefficient that has been obtained in advance for each color temperature of the light source, and can be easily calculated from, for example, the spectral characteristics of color filters and the spectral characteristics of the light source.

Here, when the horizontal pixel pitch and the vertical pixel pitch of an imaging device are pH and pV, respectively, and the number of pixels of horizontal color shift is dx and the number of pixels of vertical color shift is dy, the following relationship holds at an arbitrary point P. It should be noted that since correction for a color shift smaller than one pixel of the imaging device is not performed, decimals can be rounded (for example, rounded down) to the nearest whole number.

$dx = kS \cos \theta / pH$ $dy = kS \sin \theta / pV$

Figure 6:
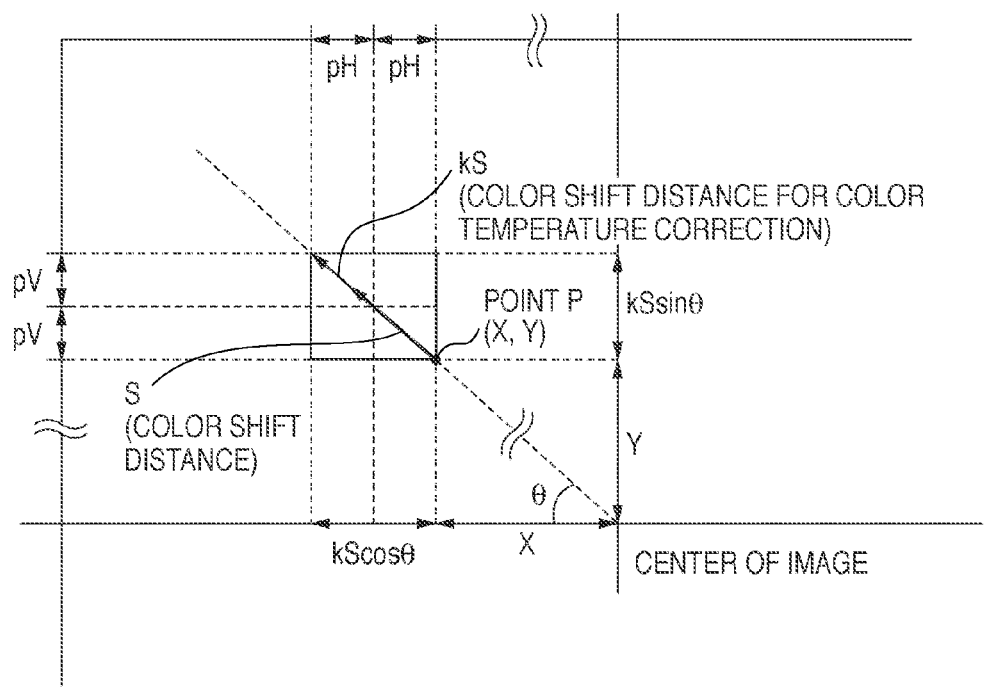
FIG. 6 is a diagram for explaining a basic chromatic-aberration-correction process according to the second embodiment.

In the example shown in FIG. 6, since dx=2 and dy=2, chromatic aberration relative to the G band can be corrected for by performing two pixels-worth of correction on the B band in both the vertical direction and the horizontal direction. It should be noted that the color temperature coefficient k may also be varied with the image height or the optical characteristics (focal length, focus position, and the like).

The foregoing is the first chromatic-aberration-correction process in the second embodiment. The first chromatic-aberration-correction method in the second embodiment is not limited to the process shown in FIG. 6, and an approach of generating a filter that restores an image in real space based on the characteristics of an objective lens and restoring an image using this filter may also be employed. Examples of the characteristics of the objective lens that can be used in this case include the point spread function (PSF), the optical transfer function (OTF), or the like.

Chromatic-Aberration-Correction Process

Figure 5:
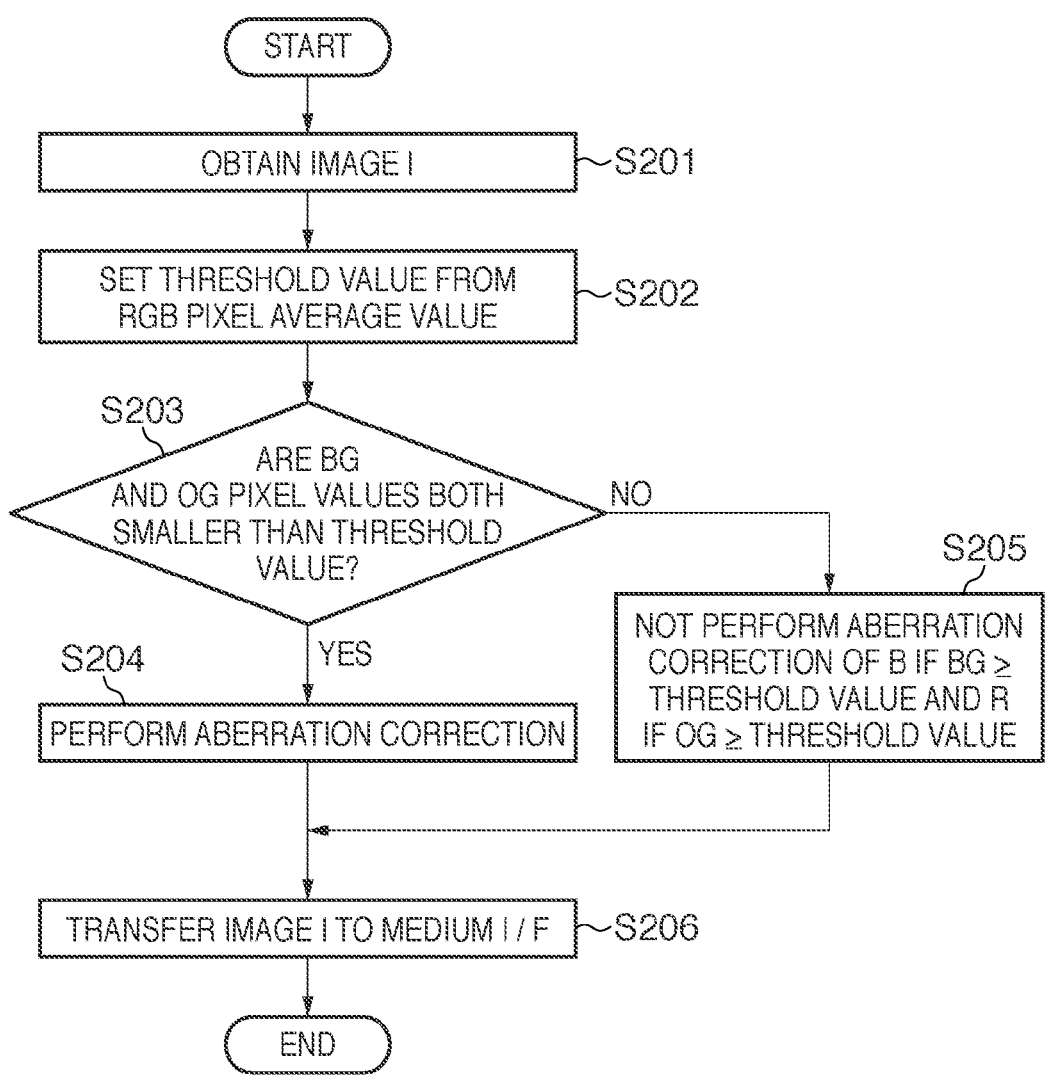
FIG. 5 is a flowchart showing a chromatic-aberration-correction process according to the second embodiment.

Hereinafter, overall processing of chromatic-aberration correction according to the second embodiment will be described in detail using the flowchart in FIG. 5. In the second embodiment, the intensity of chromatic-aberration correction for removing image degradation due to chromatic aberration in the objective lens 102 is changed in the image processing unit 108 in accordance with the spectral characteristics that have been analyzed by the spectral analysis unit 107.

First, processing of steps S201 to S203 is performed in the spectral analysis unit 107. In step S201, all the pixel values of the RGB pixels and the BG and OG pixels with respect to a predetermined processing target region are obtained as an image I. Next, in step S202, a threshold value for performing a comparison between the RGB pixel values and the BG and OG pixel values is set based on an average value of all of the RGB pixel values in the image I. For example, the calculated average value of all of the RGB pixel values can be used as the threshold value as it is.

Then, in step S203, an average of the BG pixel values and an average of the OG pixel values in the image I are individually compared with the predetermined threshold value. If both of them are smaller than the threshold value, it is determined that there is no luminance peak in the BG and OG additional bands in the image I, and the procedure is advanced to step S204. In step S204, aberration correction by the first chromatic-aberration-correction method described in FIG. 6 above is performed on the image I in the image processing unit 108, and the procedure is advanced to step S206. It should be noted that the results of comparison in step S203 performed in the spectral analysis unit 107 can be set as a predetermined flag that indicates chromatic-aberration correction/non-correction in the RAM 112 so as to be able to be referenced from the image processing unit 108.

On the other hand, in step S203, if at least either of the average of the BG pixels and the average value of the OG pixels in the image I is greater than or equal to the threshold value, it is determined that there is a luminance peak in the BG or OG additional band whose average pixel value is greater than or equal to the threshold value in the image I, and the procedure is advanced to step S205. In step S205, an aberration correction process (a second chromatic-aberration-correction process) by a second chromatic-aberration-correction method that is different from the first chromatic-aberration-correction method in step S204 is performed on the image I in the image processing unit 108. The reason for this is that even with light sources of an equal color temperature, if the spectral characteristics of light rays incident on the image sensor 105 contain a line spectrum, that is, there is a discrete luminance peak in the additional band, and the sufficient correction cannot be performed by the first chromatic-aberration-correction method.

In step S205, specifically, depending on the results of comparison in step S203, if the BG pixel is greater than or equal to the threshold value, aberration correction with respect to the B band is not performed (disablement of aberration correction), and aberration correction of the other band (R) is performed. Similarly, if the OG pixel is greater than or equal to the threshold value, aberration correction with respect to the R band is not performed, and aberration correction of the other band (B) is performed. It should be noted that if both of the BG and OG pixels are greater than or equal to the threshold value, aberration correction is not performed with respect to either of the B and R bands. The chromatic-aberration correction process in this step S205 is equivalent to setting the color temperature correction coefficient k, which is used in the description of FIG. 6 above, to 0. The color temperature correction coefficient k is not necessarily set to 0 and can also be set to a value smaller than 1 to suppress the amount of correction of the corresponding band.

Then, in step S206, the image processing unit 108 sends the processed image I to the medium I/F 109 and ends the processing.

Results of Chromatic-Aberration Correction

Figure 7A:
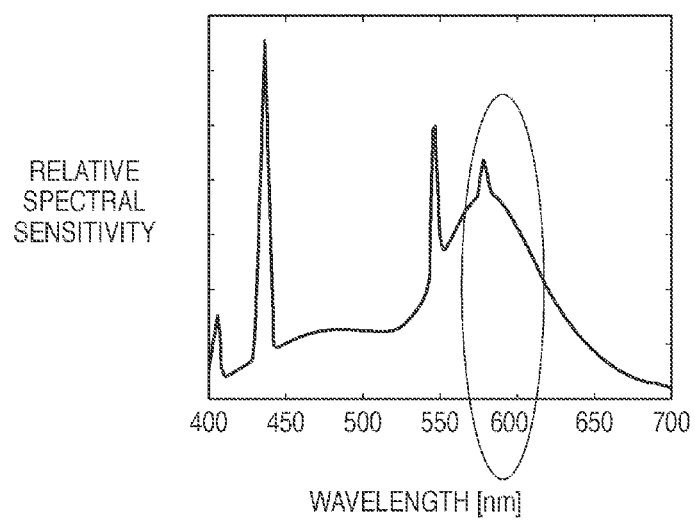
FIGS. 7A to 7D are diagrams showing the results of chromatic-aberration correction with respect to a light source containing line spectra according to the second embodiment.

Now, the results of processing with respect to a light source containing line spectra according to the second embodiment, which are shown in FIGS. 7A to 7D, will be described. FIG. 7A shows the spectral characteristics of the light source, more specifically, values obtained by measurement of a common fluorescent lamp (with color temperature equivalent to tungsten lamps). As shown circled in FIG. 7A, the spectral characteristics feature a high peak due to a line spectrum at a wavelength midway between the G band and the R band, and this peak position corresponds to the peak position of the spectral sensitivity characteristics 50 of the OG pixels shown in FIG. 2. This peak portion is close to a single color, and therefore, the objective lens 102 does not introduce chromatic aberration. Accordingly, no chromatic-aberration correction is needed in a region between the G band and the R band that corresponds to this peak portion. In the second embodiment, this peak portion is detected as the OG band signal, so that aberration correction of the R band is disabled in step S205 above.

Figure 7B:
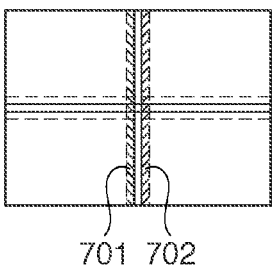
Figure 7C:
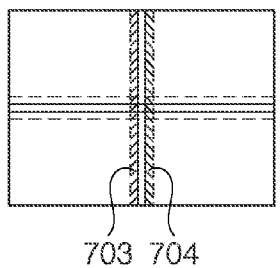
Figure 7D:

FIGS. 7B to 7D show a captured image of a chart having thin black lines on a white background and the results of chromatic-aberration correction performed thereon, and in each of FIGS. 7B to 7D, the vertical direction and the horizontal direction are aligned respectively with the radial direction and the concentric direction of the lens.

FIG. 7B is an example of a captured image without correction and shows that chromatic aberration in the objective lens 102 has caused a red color blur 701 and a green color blur 702. FIG. 7C shows the results of performing the first chromatic-aberration-correction process (in this case, chromatic-aberration correction based on data of a common D65 light source) in step S204 above on the image in FIG. 7B, rather than the second chromatic-aberration-correction process of step S205 above. FIG. 7C shows that a green color blur 703 and a red color blur 704 have occurred due to an inappropriate amount of correction in the R band, and the direction of color blur has been reversed with respect to that of the image in FIG. 7B.

FIG. 7D shows the results of performing the second chromatic-aberration-correction process in step S205 above on the image in FIG. 7B, and it is shown that there is no blur associated with color because, in this case, chromatic-aberration correction of the R band has been disabled.

Figure 8A:
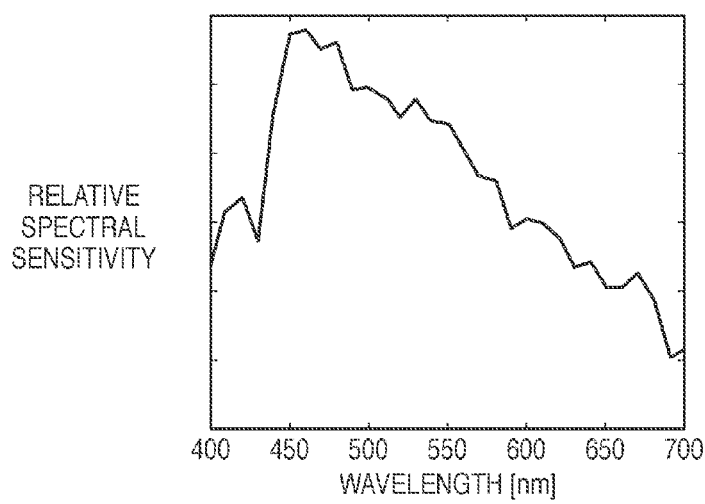
FIGS. 8A to 8D are diagrams showing the results of chromatic-aberration correction with respect to a light source containing no line spectrum according to the second embodiment.

Next, the results of processing with respect to a light source containing no line spectra according to the second embodiment, which are shown in FIGS. 8A to 8D, will be described. FIG. 8A shows the spectral characteristics of the light source, more specifically, values obtained by measurement of a D65 light source, and no line spectrum is contained.

Figures 8B, 8C, 8D:
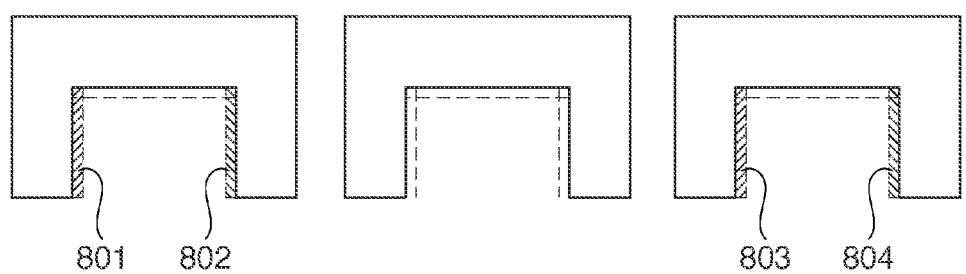

FIGS. 8B to 8D show a captured image of a chart having a white rectangular portion on a black background and the results of chromatic-aberration correction performed thereon, and in each of FIGS. 8B to 8D, the vertical direction and the horizontal direction respectively represent the radial direction and the concentric direction of the lens as in FIGS. 7B to 7D.

FIG. 8B is an example of a captured image without correction, that is, before correction and shows that chromatic aberration in the objective lens 102 has caused a green color blur 801 and a red color blur 802. FIG. 8C shows the results of performing the first chromatic-aberration-correction process (chromatic-aberration correction based on data of the D65 light source) of step S204 above on the image in FIG. 8B, and it is shown that there is no blur associated with color.

FIG. 8D shows the results of chromatic-aberration correction on the image in FIG. 8B taken with this light source containing no line spectra in the case where, as in FIG. 7D, chromatic-aberration correction of the R band has been disabled by the second chromatic-aberration-correction process in step S205. It can be seen from FIG. 8D that a green color blur 803 and a red color blur 804 are still present even though the color blurs are reduced more or less when compared with those in FIG. 8B.

As is apparent from the above-described examples in FIGS. 7A to 7D and 8A to 8D, according to the second embodiment, the intensity of chromatic-aberration-correction processing is switched depending on whether or not the light source contains a line spectrum, and appropriate correction results with suppressed color blur can thus be obtained with respect to any light source.

As described above, according to the second embodiment, chromatic aberration in the objective lens 102 can be appropriately corrected for based on the spectral characteristics of a captured image.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-265533, filed Nov. 20, 2009, which is hereby incorporated by reference herein in its entirety.

What is claimed is:

1. An image capturing apparatus comprising:
   an imager includes an image sensor in which reference band pixels, first additional band pixels, and second additional band pixels are arranged,
      wherein the imager is configured to capture an object image by the image sensor receiving incident light from an object,
      wherein the reference band pixels include R band pixels, G band pixels, and B band pixels that have spectral sensitivity peak wavelengths in a R band, a G band, and a B band, respectively,
      wherein the first additional band pixels each have a spectral sensitivity peak wavelength between the spectral sensitivity peak wavelengths of the R band and the G band,
      wherein the second additional band pixels each have a spectral sensitivity peak wavelength between the spectral sensitivity peak wavelength of the G band and the B band, and
      wherein, in the image sensor, a number of the first additional band pixels and the second additional band pixels is smaller than any of: a number of the R band pixels, a number of the G band pixels, and a number of the B band pixels;
   an obtaining unit configured to obtain reference band pixel values detected by the reference band pixels of the image sensor and additional band pixel values detected by the first additional band pixels and the second additional band pixels in the object image captured by the imaging unit;
   a spectral analyzer configured to obtain a feature quantity in spectral characteristics of the incident light by comparing an additional band pixel value with a threshold value set according to the reference band pixel values; and
   an image processor configured to perform a chromatic aberration correction process on the object image based on the feature quantity.

2. The image capturing apparatus according to claim 1, wherein the number of the first additional band pixels and the second additional band pixels is less than or equal to 0.1% of a total number of pixels in the image sensor.

3. The image capturing apparatus according to claim 1, wherein the first additional band pixels and the second additional band pixels are disposed at positions of the G band pixels among the reference band pixels in a Bayer arrangement.

4. The image capturing apparatus according to claim 1,
wherein the image processor performs a first chromatic aberration correction process if the feature quantity indicates that the additional band pixel value is smaller than the threshold value, and
wherein the image processor performs a second chromatic aberration correction process that disables, in the first chromatic aberration correction process, chromatic aberration correction processing with respect to any of the R, G, and B bands that is or are predetermined to correspond to the first additional band pixels and the second additional band pixels if the feature quantity indicates that the additional band pixel value is greater than or equal to the threshold value.

5. The image capturing apparatus according to claim 4,
wherein, in the second chromatic aberration correction process, chromatic aberration correction with respect to the R band is disabled in the first chromatic aberration correction process if an additional band pixel value of a first additional band pixel is greater than or equal to the threshold value, and chromatic aberration correction with respect to the B band is disabled in the first chromatic aberration correction process if an additional band pixel value of a second additional band pixel is greater than or equal to the threshold value.

6. The image capturing apparatus according to claim 1, wherein the spectral analyzer obtains, as the feature quantity, spectral characteristics estimated by inputting the reference band pixel values and the additional band pixel values into an estimation matrix created in advance.

7. An image processing method executed by an image capturing apparatus that includes an image sensor in which reference band pixels, first additional band pixels, and second additional pixels are arranged and that captures an object image by the image sensor receiving incident light from an object, wherein the reference band pixels include R band pixels, G band pixels, and B band pixels that have spectral sensitivity peak wavelengths in a R band, a G band, and a B band, respectively, wherein the first additional band pixels each have a spectral sensitivity peak wavelength between the spectral sensitivity peak wavelengths of the R band and the G band, wherein the second additional band pixels each have a spectral sensitivity peak wavelength between the spectral sensitivity peak wavelength of the G band and the B band, and wherein a number of the first additional band pixels and the second additional band pixels is smaller than any of: a number of R band pixels, a number of G band pixels, and a number of B band pixels, the image processing method comprising steps of:

obtaining reference band pixel values detected by the reference band pixels of the image sensor and additional band pixel values obtained by the first additional band pixels and the second additional band pixels in the object image captured by the image capturing apparatus;

obtaining a feature quantity in spectral characteristics of the incident light by comparing an additional band pixel value with a threshold value set according to the reference band pixel values; and performing a chromatic aberration correction process on the object image based on the feature quantity.

* * * * *